(12) United States Patent
Rauh et al.

(10) Patent No.: US 9,162,769 B2
(45) Date of Patent: Oct. 20, 2015

(54) OCCUPANCY SENSOR THAT MEASURES ELECTRIC CURRENT THROUGH A HEATING ELEMENT

(75) Inventors: Hans-Georg Rauh, Olching (DE); Richard Dorn, München (DE); Matthew Zuzga, Macomb, MI (US); Syed Iqbal, Windsor (CA); Igor Spasojevic, Belle River (CA)

(73) Assignee: GENTHERM GMBH, Odelzhausen (DE)

( * ) Notice: Subject to any disclaimer, the term of this patent is extended or adjusted under 35 U.S.C. 154(b) by 930 days.

(21) Appl. No.: 13/080,039

(22) Filed: Apr. 5, 2011

(65) Prior Publication Data
US 2011/0240751 A1    Oct. 6, 2011

(30) Foreign Application Priority Data

Apr. 6, 2010    (DE) .......................... 10 2010 014 084
Mar. 18, 2011    (DE) .......................... 10 2011 014 516

(51) Int. Cl.
*H05B 1/02*    (2006.01)
*B64D 13/00*    (2006.01)
(Continued)

(52) U.S. Cl.
CPC ............ *B64D 13/00* (2013.01); *B60H 1/00285* (2013.01); *B60N 2/002* (2013.01); *B60N 2/5685* (2013.01); *B60R 21/0154* (2014.10); *B60R 21/01516* (2014.10); *H05B 1/0238* (2013.01);
(Continued)

(58) Field of Classification Search
CPC ................. B60N 2/5685; B60N 2/002; B60R 21/01516; B60R 21/0154; H05B 2203/029; H05B 2203/013; H05B 1/0238; B60H 1/00285

USPC .............. 165/237; 62/244, 3.5, 3.2; 180/273; 219/217, 202
See application file for complete search history.

(56) References Cited

U.S. PATENT DOCUMENTS 374,424 A    12/1887 Ober
390,154 A    9/1888 Beach
(Continued)

FOREIGN PATENT DOCUMENTS

AT    004756 U2    8/2001
DE    4112631 C1    4/1992
(Continued)

OTHER PUBLICATIONS

Stankevic et al, "Application of aluminum films as temperature sensors for the compensation of output thermal shift of silicone piezoresistive pressure sensors," Published in Sensors and Actuators A 71 (1998) p. 161-166.
(Continued)

*Primary Examiner* — Marc Norman
*Assistant Examiner* — Max Snow
(74) *Attorney, Agent, or Firm* — The Dobrusin Law Firm, P.C.

(57) ABSTRACT

An occupancy sensor has three layers. The bottom layer contains two electrodes, and a resistive element between the electrodes. The middle layer is a spacer. The top layer is a third electrode, divided into two parts. When a person sits on the sensor, both parts of the third layer contact the resistive element. This causes current to flow through all of the electrodes. Accordingly, occupancy can be detected by measuring current flow through the electrodes. The device additionally provides heating via the resistive element. The sensor can be arranged in a vehicle seat.

20 Claims, 2 Drawing Sheets

Figure 1:
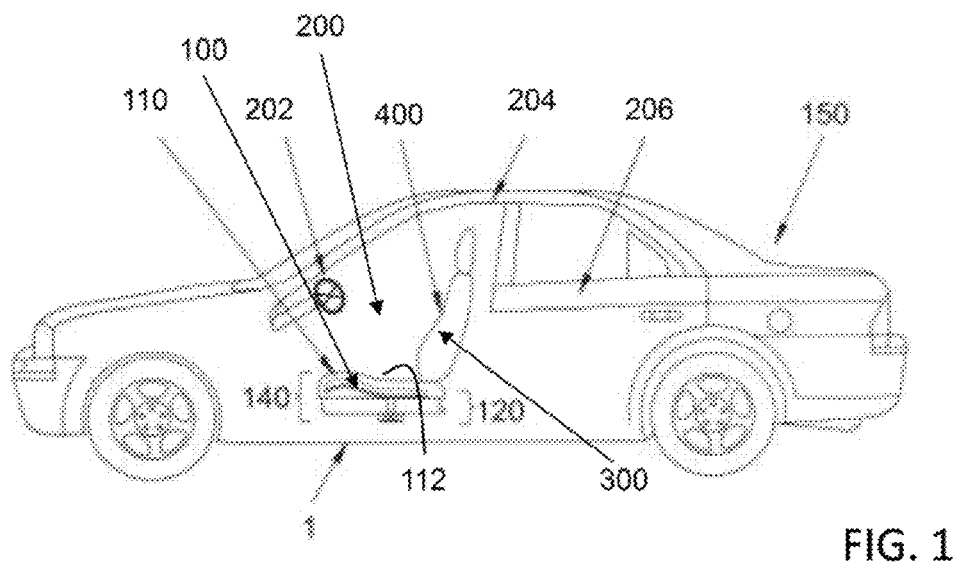

(51) Int. Cl.
    *B60N 2/56*      (2006.01)
    *B60R 21/015*    (2006.01)
    *B60H 1/00*      (2006.01)
    *B60N 2/00*      (2006.01)

(52) U.S. Cl.
    CPC ..... *H05B 2203/013* (2013.01); *H05B 2203/029* (2013.01)

(56) References Cited

U.S. PATENT DOCUMENTS

| | | |
|---|---|---|
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,913,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,628,829 A | 12/1971 | Hellig |
| 3,681,797 A | 8/1972 | Messner |
| 3,732,944 A | 5/1973 | Kendall |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,044,221 A | 8/1977 | Kuhn |
| 4,060,276 A | 11/1977 | Lindsay |
| 4,141,585 A | 2/1979 | Blackman |
| 4,175,297 A | 11/1979 | Robbins et al. |
| 4,245,149 A | 1/1981 | Fairlie |
| 4,259,896 A | 4/1981 | Hayashi et al. |
| 4,268,272 A | 5/1981 | Taura |
| 4,335,725 A | 6/1982 | Geldmacher |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,964,674 A | 10/1990 | Altmann et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,076,643 A | 12/1991 | Colasanti et al. |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,187,943 A | 2/1993 | Taniguchi et al. |
| 5,211,697 A | 5/1993 | Kienlein et al. |
| 5,221,916 A | 6/1993 | McQueen |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,516,189 A | 5/1996 | Ligeras |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,639,145 A | 6/1997 | Alderman |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,887,304 A | 3/1999 | Von der Heyde |
| 5,897,162 A | 4/1999 | Humes et al. |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 5,986,221 A | 11/1999 | Stanley |
| 6,003,950 A | 12/1999 | Larsson |
| 6,019,420 A | 2/2000 | Faust et al. |
| 6,048,024 A | 4/2000 | Wallman |
| 6,049,927 A | 4/2000 | Thomas et al. |
| 6,059,018 A | 5/2000 | Yoshinori et al. |
| 6,059,362 A | 5/2000 | Lin |
| 6,062,641 A | 5/2000 | Suzuki et al. |

(56) References Cited

U.S. PATENT DOCUMENTS

| | | | |
|---|---|---|---|
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,119,463 A | 9/2000 | Bell |
| 6,124,577 A | 9/2000 | Fristedt |
| 6,145,925 A | 11/2000 | Eksin et al. |
| 6,147,332 A | 11/2000 | Holmberg et al. |
| 6,164,719 A | 12/2000 | Rauh |
| 6,179,706 B1 | 1/2001 | Yoshinori et al. |
| 6,186,592 B1 | 2/2001 | Orizaris et al. |
| 6,189,966 B1 | 2/2001 | Faust et al. |
| 6,196,627 B1 | 3/2001 | Faust et al. |
| 6,223,539 B1 | 5/2001 | Bell |
| 6,224,150 B1 | 5/2001 | Eksin et al. |
| 6,237,675 B1 | 5/2001 | Oehring et al. |
| 6,254,179 B1 | 7/2001 | Kortume et al. |
| 6,263,530 B1 | 7/2001 | Feher |
| 6,273,810 B1 | 8/2001 | Rhodes et al. |
| 6,277,023 B1 | 8/2001 | Schwarz |
| 6,278,090 B1 | 8/2001 | Fristedt et al. |
| 6,291,803 B1 | 9/2001 | Fourrey |
| 6,300,150 B1 | 10/2001 | Venkatasubramanian |
| 6,321,996 B1 | 11/2001 | Odebrecht et al. |
| 6,415,501 B1 | 7/2002 | Schlesselman |
| 6,425,637 B1 | 7/2002 | Peterson |
| 6,434,328 B2 | 8/2002 | Rutherford |
| 6,439,658 B1 | 8/2002 | Ganz et al. |
| 6,478,369 B1 | 11/2002 | Aoki et al. |
| 6,481,801 B1 | 11/2002 | Schmale |
| 6,483,055 B1 * | 11/2002 | Tanabe et al. ............... 200/85 A |
| 6,483,087 B2 | 11/2002 | Gardner et al. |
| 6,491,578 B2 | 12/2002 | Yoshinori et al. |
| 6,494,284 B1 | 12/2002 | Cooper |
| 6,497,275 B1 | 12/2002 | Elliot |
| 6,501,055 B2 | 12/2002 | Rock et al. |
| 6,505,886 B2 | 1/2003 | Gielda et al. |
| 6,511,125 B1 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson et al. |
| 6,592,181 B2 | 7/2003 | Stiller et al. |
| 6,598,405 B2 | 7/2003 | Bell |
| 6,604,426 B2 | 8/2003 | Kraetzl |
| 6,604,785 B2 | 8/2003 | Bargheer et al. |
| 6,606,866 B2 | 8/2003 | Bell |
| 6,619,736 B2 | 9/2003 | Stowe et al. |
| 6,625,990 B2 | 9/2003 | Bell |
| 6,626,386 B1 | 9/2003 | Stiner et al. |
| 6,626,455 B2 | 9/2003 | Webber et al. |
| 6,626,488 B2 | 9/2003 | Pfahler |
| 6,629,725 B1 | 10/2003 | Kunkel et al. |
| 6,637,210 B2 | 10/2003 | Bell |
| 6,642,444 B2 | 11/2003 | Hagiwara et al. |
| 6,664,518 B2 | 12/2003 | Fristedt et al. |
| 6,672,076 B2 | 1/2004 | Bell |
| 6,676,207 B2 | 1/2004 | Rauh et al. |
| 6,682,140 B2 | 1/2004 | Minuth et al. |
| 6,685,553 B2 | 2/2004 | Aoki |
| 6,687,937 B2 | 2/2004 | Harker |
| 6,700,052 B2 | 3/2004 | Bell et al. |
| 6,719,534 B2 | 4/2004 | Aoki et al. |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,812,395 B2 | 11/2004 | Bell et al. |
| 6,817,675 B2 | 11/2004 | Buss et al. |
| 6,826,792 B2 | 12/2004 | Lin |
| 6,828,528 B2 | 12/2004 | Stöwe et al. |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,893,086 B2 | 5/2005 | Bajic et al. |
| 6,906,293 B2 | 6/2005 | Schmiz et al. |
| 6,929,322 B2 | 8/2005 | Aoki et al. |
| 6,957,545 B2 | 10/2005 | Aoki |
| 6,976,734 B2 | 12/2005 | Stoewe |
| 7,013,653 B2 | 3/2006 | Kamiya et al. |
| 7,040,710 B2 | 5/2006 | White et al. |
| 7,052,091 B2 | 5/2006 | Bajic et al. |
| 7,070,232 B2 | 7/2006 | Minegishi et al. |
| 7,083,227 B2 | 8/2006 | Brennan et al. |
| 7,114,771 B2 | 10/2006 | Lofy et al. |
| 7,131,689 B2 | 11/2006 | Brennan et al. |
| 7,147,279 B2 | 12/2006 | Bevan et al. |
| 7,168,758 B2 | 1/2007 | Bevan et al. |
| 7,202,444 B2 | 4/2007 | Bulgajewski |
| 7,231,772 B2 | 6/2007 | Bell et al. |
| 7,290,759 B1 | 11/2007 | Lavrencik |
| 7,306,283 B2 | 12/2007 | Howick et al. |
| 7,338,117 B2 | 3/2008 | Iqbal et al. |
| 7,356,912 B2 | 4/2008 | Iqbal et al. |
| 7,370,911 B2 | 5/2008 | Bajic et al. |
| 7,500,536 B2 * | 3/2009 | Bulgajewski et al. ........ 180/273 |
| 7,708,101 B2 | 5/2010 | Hofmann |
| 7,827,805 B2 | 11/2010 | Comiskey |
| 8,791,394 B2 * | 7/2014 | Han et al. ................... 219/538 |
| 2002/0000742 A1 | 1/2002 | Wato et al. |
| 2005/0067401 A1 | 3/2005 | Fernandez et al. |
| 2005/0085968 A1 | 4/2005 | Panic |
| 2006/0162983 A1 | 7/2006 | Hofmann |
| 2006/0219699 A1 * | 10/2006 | Geisel et al. ................. 219/497 |
| 2006/0249995 A1 * | 11/2006 | Stoewe et al. ............ 297/180.14 |
| 2006/0270826 A1 * | 11/2006 | Yamaguchi et al. .......... 528/353 |
| 2007/0176471 A1 | 8/2007 | Knoll |
| 2007/0215601 A1 | 9/2007 | Frank |
| 2007/0290532 A1 * | 12/2007 | Frank ...................... 297/180.12 |
| 2008/0179306 A1 * | 7/2008 | Howick et al. ............... 219/201 |
| 2010/0152975 A1 * | 6/2010 | Nakagawa et al. ............ 701/45 |
| 2011/0121618 A1 * | 5/2011 | Fischer et al. .......... 297/180.12 |
| 2011/0226751 A1 | 9/2011 | Lazanja et al. |
| 2011/0297660 A1 * | 12/2011 | Fritz ............................ 219/202 |
| 2012/0049586 A1 * | 3/2012 | Yoshimoto et al. ...... 297/180.12 |

FOREIGN PATENT DOCUMENTS

| | | |
|---|---|---|
| DE | 19920451 A1 | 2/1999 |
| DE | 19737636 A1 | 3/1999 |
| DE | 1209026 A2 | 6/2001 |
| DE | 10241571 A | 3/2004 |
| DE | 10316732 A1 | 10/2004 |
| FR | 2301989 A1 | 2/1975 |
| JP | 2002/234332 A | 8/2002 |
| WO | 94/09684 A1 | 5/1994 |
| WO | 02/06914 A1 | 1/2002 |
| WO | 03/077710 A | 9/2003 |
| WO | 2005/035305 A | 4/2005 |
| WO | 2005/042301 A1 | 5/2005 |
| WO | 2005/047056 A1 | 5/2005 |

OTHER PUBLICATIONS

Obieta, I. et al., High-temperature polysilicon pressure micorsensor, Published in Sensors and Actuators A 46-47 (1995) 161-165.

Lim et al., "Flexiblem membrane pressure sensor," Sensors and Actuators A 119 (2005) 332-335.

Automotive Heated Seats—Heated Steering Wheels, IGB Automotive Ltd., received by Assignee W.E.T, Automotive Systems, May 2003.

GMT 830 Heating & Ventilation System, IGB Automotive Ltd., received by Assignee W.E.T. Automotive Systems, Jun. 2003.

(56) References Cited

OTHER PUBLICATIONS

Specializing in Seat Ventilation and Heating Systems, Seat Comfort Systems, http://www.seatcomfort.comsemashow1.htm, Jun. 10, 2003.

Excerpt from website http://www.seatcomfort.com/ semashow1.htm, Specializing in Seat Ventilation and Heating Systems, Seat Comfort Systems Unveils 3 New Seat Heater Products.

Co-Pending U.S. Appl. No. 13/106,148, filed May 12, 2011. Published 2011/0226751.

* cited by examiner

OCCUPANCY SENSOR THAT MEASURES ELECTRIC CURRENT THROUGH A HEATING ELEMENT

CLAIM OF PRIORITY

The present application claims the benefit of the priority of the filing date of the German application, DE 10 2010 014 084.8 filed 6 Apr. 2010, which is herein incorporated by reference for all purposes.

BACKGROUND OF THE INVENTION

A subject matter of the present invention is a multifunction product pursuant to the preamble of Claim 1.

PRIOR ART

U.S. Pat. No. 7,500,536 describes a seat heater that is provided with a pressure sensor to detect an occupant. It is desirable to further optimize such systems with respect to their functionality and the cost of producing them.

SUBJECT MATTER OF THE INVENTION

In view of this background, a technical concept with the features of Claim 1 is proposed. Further advantageous embodiments can be found in the further Claims and the subsequent description.

Multifunction product 1 for the provision of at least two functions in a functional zone, characterized in that the multifunction product 1 has at least two different types of a functional device from the following group: a temperature control 110, a cooling device, a heater unit 100, an air-conditioning unit, a ventilation unit, and an electrical circuit. This permits a combination of functional elements in an assembly that are adapted to each other and which are compact and easily operated.

Multifunction product 1 according to Claim 1, characterized in that the multifunction product 1 is essentially formed through a combination of two or more functional devices. This permits a simple modular design that does not need any substantial additional costly materials.

Multifunction product according to Claim 1 or 2, characterized in that it has a heater unit 100 with at least one support 9 on which at least one electrical heater resistor element 4 is arranged. This facilitates the functional zone to be electrically heated.

Multifunction product 1 according to one of Claims 1-3, characterized in that it has at least one detector element 30 for detecting at least one measurand, the value of which depends on the presence of a person in the vicinity of the detector element 30. This makes it possible to determine the presence, posture, position, weight, size and/or identity of a person.

Multifunction product 1 according to Claim 1, characterized in that at least one functional device is provided with at least one electrical conductor track that is provided as a coating on a support 9. This permits a cost effective and uncomplicated electrical power supply.

Multifunction product 1 according to one of Claims 1-5, characterized in that it has at least one heater unit 100 with at least one electrically conductive filament as heater resistor element 4, that it has at least one detector element 30 with at least one conductor track, that at least one of the filament and conductor components is arranged along a support 9 and that the support 9 runs between the filament and the conductor. By arranging the filament and conductor on different sides of the support it allows that the electrical conductors of both devices can be safely electrically isolated from each other also without electrical insulation, even if electrical restoring forces should induce the filament to move its position.

Multifunction product 1 according to one of Claims 1-6, characterized in that at least one detector element 30 uses a conductor track that serves as a heater resistor element 4 as transducer at least intermittently. This permits saving material.

Multifunction product 1 according to one of Claims 1-7, characterized in that the detector element 30 has at least one first measuring point 31 in a surface 10 subjected to a mechanical load and at least one second measuring point 32 in a second surface 10' that is not subjected to a load. This permits a self-check of the detector element and its self-calibration, even under highly variable conditions of use.

The invention is particularly suited for heating and detection as well as use for all upholstered items, in particular automobile seats, seat cushions, passenger compartment trims, armchairs or office equipment, for example.

FIGURES

The details of the invention are explained hereinafter. These explanations are intended to make it easier to understand the invention. But they simply serve as examples. Of course, within the scope of the invention defined by the independent Claims, single or multiple features described can also be omitted, modified, or supplemented. The features of different embodiments can naturally also be combined with one another. The decisive factor is that the concept of the invention is essentially implemented. If a feature must be at least partially accomplished, then this includes that this feature is also completely or essentially completely accomplished. In this context, "essentially" means in particular that the implementation permits that the desired benefit is accomplished to the extent that it can be identified. This can mean in particular, that a respective feature is accomplished at least 50%, 90%, 95% or 99%. If a minimum quantity is stated, then also more than this minimum quantity can of course be used. If the quantity of a component is stated to be at least one, then this particularly includes also embodiments with two, three, or any other multiplicity of components. Anything that is described for one object, can also be applied for the predominant part or the entirety of all other similar objects. Unless stated otherwise, intervals include their endpoints.

Figure 2:
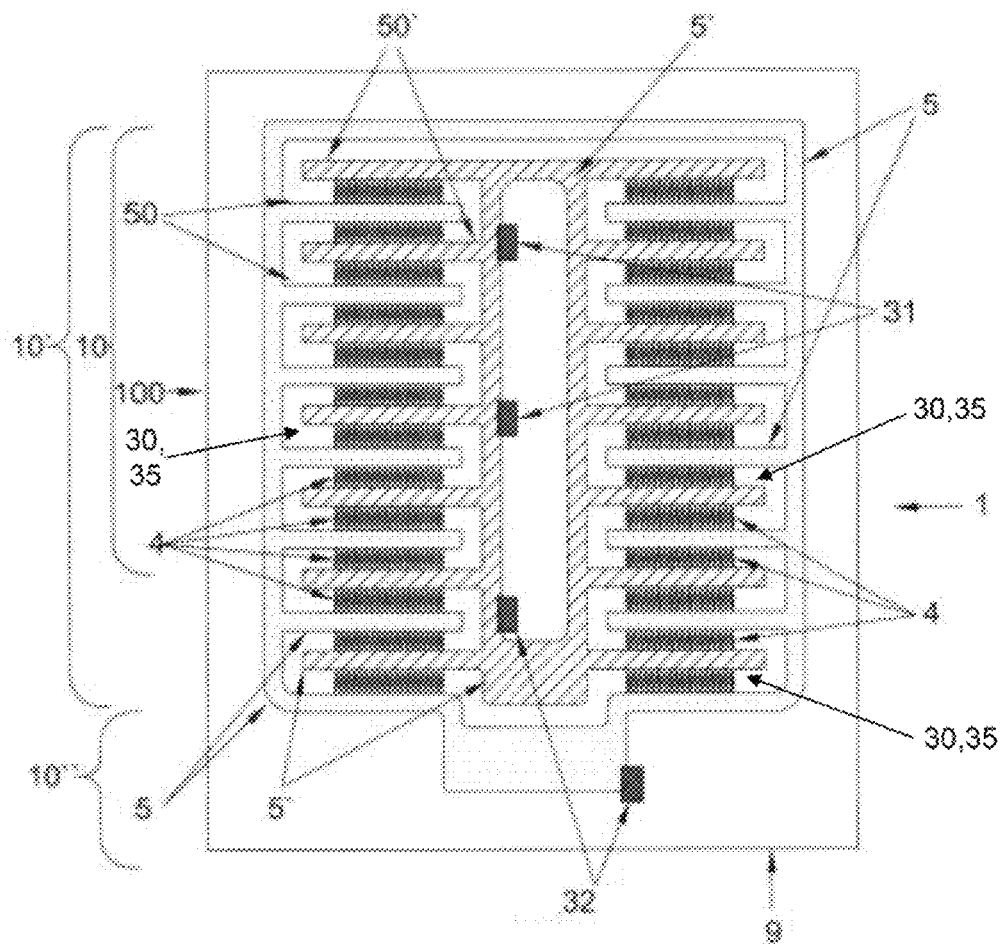
Figure 3:
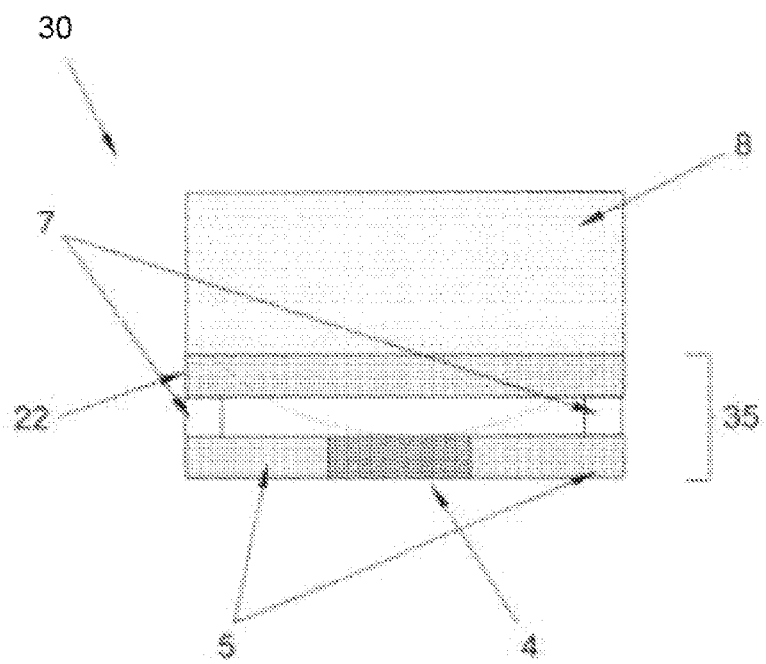
Figure 4:
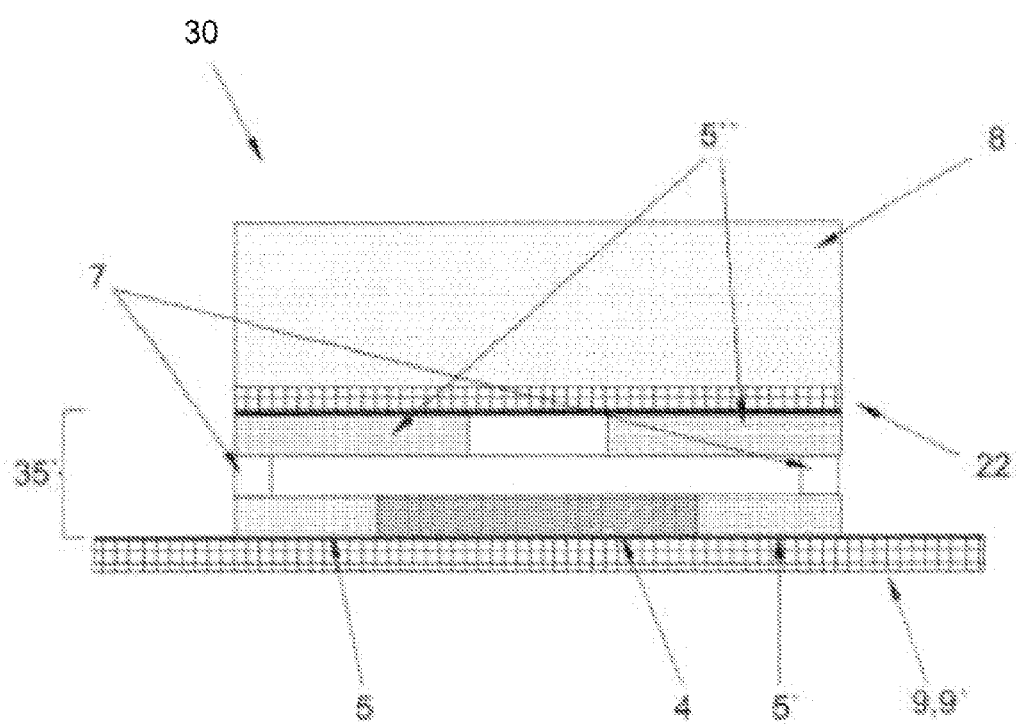

In the following, the Figures show:

FIG. 1 Automobile with multifunction product 1 as a partial longitudinal section FIG. 2 Multifunction product 1 of FIG. 1 as an enlarged horizontal projection FIG. 3 First embodiment of a detector element of a multifunction product 1 of FIG. 2 as a cross section FIG. 4 Second embodiment of a detector element of a multifunction product 1 of FIG. 2 as a cross section

DESCRIPTION OF THE INVENTION

FIG. 1 shows a vehicle 150. This can involve for example an aircraft, a railroad car, a ship, or like in this instance, an automobile.

The vehicle 150 has at least one object 200 to be temperature controlled. Just to make it clear, this involves all components which can come into contact with a user of the passenger compartment, such as steering gear 202 for vehicles, a dashboard, an armrest, a door trim 206, a seat cushion, a thermal blanket, an inside roof lining 204, a padding 8, a cover 400, or as in this case, a seat 300.

The object 200 to be temperature controlled has preferably at least one padding 8 and/or at least one cover 400.

The object 200 to be temperature controlled and/or the vehicle 150 has at least one multifunction product 1, That product provides at least two functionalities, in this context, this can particularly involve a combination of a heater unit 100 and a detector element 30, especially for detection of the presence or position of persons, The product can also have an air duct 120, a cooling device, a humidity measuring device, a magnetic field therapy device and/or any other additional function.

The multifunction product 1 preferably is a component that can be inserted, which preferably has an essentially two-dimensional and/or flat design, in the form of a multilayer module. This is preferably arranged on, below, or in a functional zone, i.e. in an area that has to be temperature controlled, to be monitored, or onto which another effect is to be applied.

This is preferably formed essentially by its functional units, possibly supplemented by a support, a casing device and or a retaining device.

The object 200 to be temperature controlled and/or a multifunction product 1 preferably has at least one air conditioning unit 140. This serves for heating, cooling, ventilation and/or dehumidification, for example, of surfaces in the passenger compartment of an automobile that come into contact with the user.

The air-conditioning unit 140 has at least one temperature control device 110 and/or at least one air duct 120. The temperature control device 110 is to be understood as any device that can be used for specifically changing the temperature in its environment, e.g. any device, which has at least one electrical heater resistor element 4, a Peltier element and/or air moving means, such as a fan, or which is essentially created from it. It is to be understood that moving means can refer to any device which can be used for a specific change of the air composition or the airflows in a specific surface area or three-dimensional area for the replacement of air, such as an on-board air-conditioning system, at least partially air-permeable filler media, filler fabrics and/or temperature control inserts.

Preferably at least one air conditioning device 140 has at least one temperature control 110, such as is designed pursuant to FIG. 2 as a flat, flexible heating element that is essentially designed as textile fabric or as a film. A textile fabric is a flat entity made of yarn or fibers. The temperature control 110 can be integrated as an insert, for example, into the padding of an interior trim item of a seat 300, for example.

At least one multifunction product 1 has at least one support 9. In this context, support means any device that serves for the positioning, alignment and/or holding of a functional component at its place of application. A support can be built-up from one but also from multiple components, for example from one or multiple layers which can be connected to each other across the whole surface, linearly, or in spots. For this purpose, the support can be a component of a temperature control 110, for example, and/or of at least of an object 200 to be temperature-controlled. It is preferably formed flat and at least partially from a textile fabric, knit fabrics, knitwear, woven fabric, nonwoven fabric, flexible thermoplastics, air-permeable materials and/or a dense, perforated, or knopped sheeting. But it can also be formed by an object to be temperature-controlled, for example, by the object to be temperature controlled 200, for example, or at least a part of its surface. The support 9 is preferably air-permeable by means of perforations with apertures for the passage of air, for example.

Preferably at least one support 9 is manufactured at least partially from polyester, especially from a polyester film. The support 9 and/or the polyester is preferably temperature-stabilized, i.e. that it is resistant against temperatures that occur in heated operation (e.g. by chemical and/or thermal pretreatment). The length of the support 9 especially changes in a temperature range from $-20°$ C. to $100°$ C. by a maximum of 0.1% of its overall length.

The temperature control 110 in particular has at least one heater resistor element 4 that is arranged at, on, and/or in the support 9. Preferably, a plurality of heater resistor elements 4 is provided, which are preferably arranged electrically parallel to each other. At least one heater resistor element 4 is fixed to the support 9 partially or across the entire surface with an adhesive, for example.

Especially preferred is that at least one heater resistor element 4 is as a conductor track by application of an electrical conductive resistor layer onto a support 9 made of foil. Preferably, at least one heater resistor element 4 has PTC characteristics (positive temperature coefficient) in order to simplify a controller and/or temperature monitoring of heater unit 100 or make it unnecessary.

But at least one heater resistor element 4 can also be provided without PTC characteristics. At least one heater resistor element 4 was preferably manufactured using a polymer paste containing graphite.

The temperature control 110 preferably has at least one electrode 5 to provide electrical power into at least one heater resistor element 4. Here, two electrodes 5, 5' are provided which are running close to the edge along the support 9 spaced apart from one another. Here they have prongs 50, 50', so that the two electrodes 5, 5' are in the shape of a comb and are positioned meshing into each other and are positioned on the support 9 without electrical contact to each other. At least one of the electrodes 5, 5' has at least one electrical conductor which is preferably at least partially formed from copper or another metal, from a metallic or metal-coated film, metal fibers or synthetic fibers with metal coating. The electrode 5, 5' can be formed from one or several at least partially electrically conductive contact strands and/or an electrically conductive textile fabric, such as from knitwear, woven fabric, knitted fabric and/or nonwoven fabric. Preferably it is designed as a conductor track on a support 9 from film and by imprinting of an electrically conductive paste (e.g. with silver particles or other metal particles), for example.

In some embodiments, only a pail of a surface to be heated is covered by heater resistor elements 4, Gaps in the heated surface are also caused by the electrodes 5, 5', For this reason it can be useful if the heater unit 100 has at least one heat dissipation layer 112, which is arranged above the temperature control 110 for example and is arranged parallel in relation to it, in order to distribute the heat generated by the heater resistor elements 4 quickly and evenly. Such layer can at least partially consist of aluminum, for example.

The object 200 to be temperature controlled and/or the multifunction product 1 has at least one detector element 30 used to identify persons on the seat. In this context, this can involve simply the detection of the presence of a user or also for assigning same to a specific category of persons (baby seat, child, adult, . . . ) and/or to determine its characteristics such as position or mass.

The detector element 30 has at least one sensor 35 in order to detect the presence of a person, its position, size, weight, posture as well as possibly any further parameters that are associated with it.

The sensor 35 can detect an electrical capacity, a change in capacitance, an electrical resistor one 4 and/or a change in electrical resistance which occurs or is affected as a result of the presence and the type of a person; for example in that the body of the person acts as the non-conductor between two capacitor foils that are provided on a seat 300 and thus changes the electrical capacity of a capacitor formed by the capacitor foils. Or by the fact that the weight of the person results in a mechanical elongation of a strain gauge arranged in support 9 and therefore results in an increase in electrical resistance. Or by the fact that the mass of the person results in a temperature change or in thermal insulation and therefore a changed thermal convection.

But also other principles of detection are conceivable, such as optical recognition, for example by obscuration of optical fibers in the seat surface.

The measuring results of the occupant sensor are preferably used for the identification or a classification of the user, and to determine a specific operating mode or specific operating parameters depending on those measuring results. This can be the selection of a personalized climatic profile, the automatic operation of a system (e.g. the seat heater) or to deactivate an airbag when a child seat is identified, for example. The identification can be performed using specified values for thel weight of persons, weight distribution across the seat surface, thermal conductivity values, temperature distribution across the seat surface or similar, for example.

Using these measuring results, at least one heater unit 100, at least one air conditioning unit, at least one fan and/or at least one massage device can be switched on or off, for example. The measuring result can also be used to activate a headrest and/or adapt its position, and/or to prepare it for an adjustment to the front in the event of a rear-end collision. Also an adaptation of fan speed, massage pressure, type of massage, foam hardness and seat contour would be possible, for example.

For contating at least one sensor 35, preferably at least one electrode 5 or conductive track is provided, the type of which can correspond to the electrodes 5 of the heater unit 100.

At least one sensor 33 is assigned to a surface 10 to be monitored. This can be done, for example, in that the sensor 33 is arranged in the form of a foil that scans the entire surface of the surface 10 to be monitored, for example. It is preferably essentially the same size as the surface to be temperature controlled. It can be arranged in a seat or armrest surface or in a lumbar support, for example.

The detector element 30 preferably has at least one support 9'. This is preferably designed similar to the support 9 of at least one heater unit 100. Preferably, the support 9' of at least one detector element 30 is identical with at least one support 9 of at least one heater unit 100. This can additionally be part of the wall of an air duct device or be connected with same.

For that purpose, at least one heater resistor element 4 and at least one sensor 35 can be arranged in the same plane, preferably on the side of the support 9 that is facing the user. In this case, both at least one heater resistor element 4 and at least one sensor 35 are imprinted at least partially onto a support 9 made of film and are preferably in contact by means of electrodes 5 that are also printed.

But depending on the components used, also an arrangement (not shown) of sensor and heater resistor elements on planes that are different from each other can be useful. This is the case when using heater resistor elements made from a stranded flexible conductor (especially steel), since such heater resistor elements have the tendency to divert from their specified routing as a result of the spring forces in the stranded flexible conductor. Here it is recommended, for example, to affix at least one heater resistor element to a top side of a support that is facing towards a user. At least one sensor is preferably arranged, preferably imprinted, on a rear side of the support that is facing away from the user. Such sensor is preferably designed as a capacitative sensor, because its conductor can be positioned more permanently and more accurately.

It can also be provided to use different supports 9, 9' and arrange them spaced at intervals to each other, for example, in order to heat a seat surface and monitor the surface of a rest, for example.

At least one heater unit 100 and at least one detector element 30 can be arranged in a common switching circuit. They can also be, arranged into separate switching circuits, however, and be mutually switchable, if required.

It can be provided that on at least one support 9, 9', on at least one heater unit 100 and/or on at least one detector element 30, at least one transponder for signal transmission or for signal reception, at least one integrated circuit or chip and/or at least one electrical storage device, e.g. a capacitor or accumulator, is arranged.

It can be provided that like in FIG. 2 multiple sensors 35 are arranged on a flat heater unit 100. These sensors 35 can be arranged on measuring points 31, 32 that are of special interest within heated surfaces 10', or like shown in FIG. 2, outside of heated surfaces 10".

Preferably a sensor 35, as shown in FIG. 3, can have at least two electrodes 5 between which an electrical resistor in the form of a printed circuit heater resistor element 4 is arranged. Electrodes 5 and heater resistor element 4 are at the same time part of the heater unit 100 in this context. If the system is now loaded by the weight of a user, then the heat distribution and/or the heat flow through a padding 8 changes. This results in changes in the local temperature and/or the flow of current through the heater resistor element 4. Both can be detected by sensor 35.

In order to amplify the effect described, a cover layer 22 as part of a multifunction product 1, for example, can be provided, which in the normal state is spaced apart from the heater resistor element 4 and the electrodes 5 by one or multiple spacers 7. If the sensor 35 is subjected to a load, the spacers 7 are compressed and the cover layer 22 makes contact with the heater resistor element 4 and/or the electrodes 5. The changing heat distribution generated thereby can likewise be detected.

If the cover layer 22 is at least partially made of electrically conductive material, then it can also serve as a switch to bridge the heater resistor element 4 between the two electrodes 5. This current flow can likewise be detected and used as a measurand.

In an embodiment pursuant to FIG. 4, a sensor 35' can also have two electrodes 5" of its own, which are arranged above a heater resistor element 4. In the normal state they are spaced apart from the heater resistor element 4 by spacer 7 so that no current flows through. During mechanical loading, the electrodes 5" of the sensor 35 are pressing against the heater resistor element 4. As a result, the sensor 35' detects a changed voltage and/or current flow. Depending on the configuration, a temperature change and/or a changed current flow will occur in the heater resistor element 4. All of these changes can be utilized as a measurand for the identification of persons.

In one embodiment pursuant to FIG. 2, measuring points 31 can also be imprinted on a support 9, on which a heat measurement current and/or the temperature occurring on these measuring points are monitored. A comparison of measuring values of measuring points 31 within a surface 10 to be monitored, with measuring values of measuring points 32 outside of the zone subjected to the weight of a user will then provide information as to the degree of the coverage or loading of the surface to be monitored. Heat radiation in areas subjected to load is significantly higher than in areas that are not subjected to load, because of foam compression, for example.

LIST OF REFERENCE SYMBOLS

1 Multifunction product
4 Heater resistor element
5, 5', 5" Electrode
7 Spacer
8 Padding
9, 9' Support
10 Surface
10' Heated surface
10" Unheated surface
22 Cover layer
30 Detector element
31, 32 Measuring points
33 Sensor of the surface to be monitored
35, 35' Sensor
50, 50' Prongs
100 Heater unit
110 Temperature control
112 Heat dissipation layer
120 Air duct
140 Air-conditioning device
150 Vehicle
200 Object to be temperature-controlled
202 Steering gear for vehicles
204 Inside roof lining
206 Door trim
300 Seat
400 Cover

The invention claimed is:

1. A heating product comprising:
a support;
a sensor arranged on the support, the sensor comprising:
  i. a first electrode,
  ii. a second electrode,
  iii. a third electrode including a gap, the gap diving the third electrode into two parts,
  iv. a heater resistor, and
  v. a spacer; and
a cover layer arranged on the sensor,
wherein the first electrode, the second resistor, and the heater resistor are in contact with a same surface of the support and are arranged on a same plane,
wherein the heater resistor is located in between, and in contact with, the first electrode and the second electrode,
wherein the spacer is located above the first electrode and the second electrode, and is configured to separate the first electrode and the second electrode from the third electrode when the cover layer not subject to a mechanical load,
wherein when the cover layer is subject to the mechanical load, the two parts of the third electrode contact the heater resistor causing a current flow through the first electrode, the second electrode, the third electrode, and the heater resistor, and
wherein the heating product includes a device configured to detect a presence of the mechanical load on the cover layer by measuring the current flow through the heater resistor.

2. The heating product according to claim 1, wherein the heater resistor is an electrical conductor track that is provided as a coating on the support.

3. The heating product according to claim 1, wherein the heater resistor is an electrically conductive filament.

4. The heating product according to claim 1, wherein the heater resistor comprises a conductor track; and
wherein the conductor track intermittently serves as a transducer.

5. The multifunction product according to claim 1, wherein the heating product comprises an identical second sensor, the first sensor is arranged at a first measuring point on the support that is subjected to the mechanical load and the identical second sensor is arranged at a second measuring point on the support that is not subjected to the mechanical load.

6. The multifunction product of claim 1, wherein the heating product is comprised of a plurality of heater resistors arranged electrically parallel to each other.

7. The multifunction product of claim 1, wherein the first electrode provides power to the heater resistor element.

8. The multifunction product of claim 1, wherein the support is formed flat and is air permeable.

9. A method of detecting a mechanical load, comprising:
I. providing a multifunction product, the multifunction product comprising:
  a support; and
  a sensor arranged on the support, the sensor comprising:
    i. a first electrode,
    ii. a second electrode,
    iii. a third electrode including a gap, the gap diving the third electrode into two parts,
    iv. a heater resistor, and
    v. a spacer; and
  a cover layer arranged on the sensor,
  wherein the first electrode, the second resistor, and the heater resistor are in contact with a same surface of the support and are arranged on a same plane,
  wherein the heater resistor is located in between, and in contact with, the first electrode and the second electrode,
  wherein the spacer is located above the first electrode and the second electrode, and is configured to separate the first electrode and the second electrode from the third electrode when the cover layer not subject to a mechanical load,
II. detecting the mechanical load on the cover layer when the mechanical load presses the two parts of the third electrode against the heater resistor and current flows through the first electrode, the second electrode, the third electrode, and the heater resistor, and measuring the current flow through the heater resistor.

10. The heating product of claim 1, wherein a padding layer is arranged directly above the cover layer.

11. The heating product of claim 1, wherein the heating product is arranged inside of a seat.

12. The heating product of claim 1, wherein the heating product is arranged inside of a vehicle.

13. The heating product of claim 1, wherein the third electrode transmits an electrical current to the heater resistor.

14. The heating product of claim 1, wherein the spacer is compressible.

15. The heating product of claim 1, wherein the sensor is one of a plurality of sensors, and the plurality of sensors are arranged inside of a vehicle seat, and
   wherein each of the plurality of sensors are individually capable of detecting the presence of the mechanical load.

16. The method of claim 9, wherein the multifunction product is arranged in a vehicle seat.

17. The method of claim 9, wherein the mechanical weight is the weight of a person.

18. The method of claim 9, wherein multiple multifunction products are arranged inside of a vehicle seat, and each of the multiple multifunction products are capable of detecting the presence of the mechanical load.

19. The method of claim 9, wherein the spacer is compressed when the mechanical load presses the two parts of the third electrode against the heater resistor.

20. The method of claim 9, wherein the support is formed flat and is air permeable.

* * * * *